United States Patent [19]
Satoh et al.

[11] Patent Number: 5,253,242
[45] Date of Patent: Oct. 12, 1993

[54] DOUBLE-SIDED OPTICAL DISC PLAYER

[75] Inventors: Isao Satoh, Neyagawa; Yoshihisa Fukushima, Osaka; Yuji Takagi, Hirakata; Yasushi Azumatani, Neyagawa; Hiroshi Hamasaka, Nishinomiya, all of Japan

[73] Assignee: Matsushita Electric Industrial Co., Ltd., Osaka, Japan

[21] Appl. No.: 878,343

[22] Filed: May 4, 1992

[30] Foreign Application Priority Data

May 10, 1991 [JP] Japan .................................. 3-105469

[51] Int. Cl.⁵ .............................................. G11B 7/00
[52] U.S. Cl. ........................................ 369/47; 369/50; 369/54; 369/44.37; 369/32
[58] Field of Search ............... 369/44.26, 44.28, 44.29, 369/44.31, 44.32, 44.37, 47, 124, 32, 48, 50, 54, 44.38, 92, 98, 56, 58; 360/77.05, 78.14, 72.2

[56] References Cited

U.S. PATENT DOCUMENTS
4,843,494  6/1989  Cronin et al. ..................... 369/44.37

OTHER PUBLICATIONS
Patent Abstracts of Japan vol. 13, No. 203(P-870) is May 1989 and JP-A-1023424.
Patent Abstracts of Japan vol. 14, No. 321(P-1074) Jul. 10, 1990 and JP-A-2103731.
Patent Abstracts of Japan vol. 14, No. 064(P-1002) Feb. 6, 1990 and JP A-1286 129.

*Primary Examiner*—W. R. Young
*Assistant Examiner*—Nabil Hindi
*Attorney, Agent, or Firm*—Ratner & Prestia

[57] ABSTRACT

A double-sided optical disc player which comprises first and second optical heads for radiating laser beams to tracks on respective sides of a double-sided optical disc; first and second ID read-out units for reading respective sector addresses out from associated sector identifiers; an ID offset detecting unit for calculating, in response to outputs from the ID read-out unit, the ID offset value descriptive of an angular displacement in sector position between the opposite sides of the optical disc traced by the associated optical heads; an ID offset retaining unit for retaining the ID offset value; a first sector recording and/or production control unit for detecting a target sector when an sector address output from the first ID read-out unit coincide with the target sector and for activating a recording or reproduction of information; an adder for adding the ID offset value to an output from the second ID read-out unit; a second sector recording and/or reproduction control unit for detecting a target object when an corrected sector address outputted from the adder coincides with the target sector and for activating the recording or reproduction of the information; and an information recording and/or reproducing unit for recording or reproducing information on or from the target sectors on the respective sides of the optical disc by means of the first and second sector recording and/or reproduction control units.

6 Claims, 5 Drawing Sheets

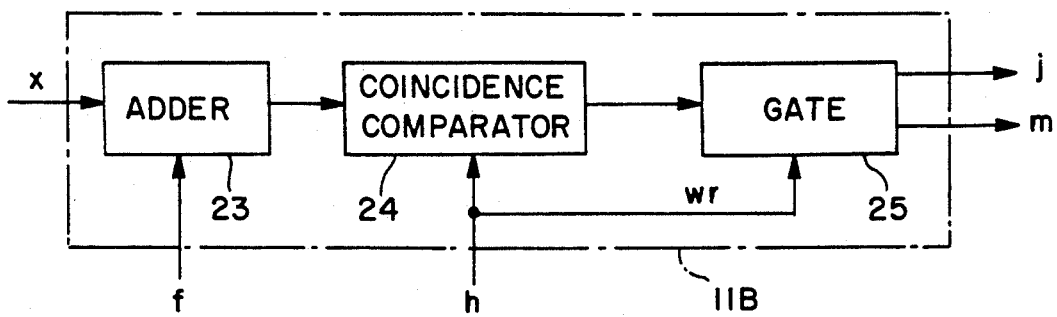
FIG. 2
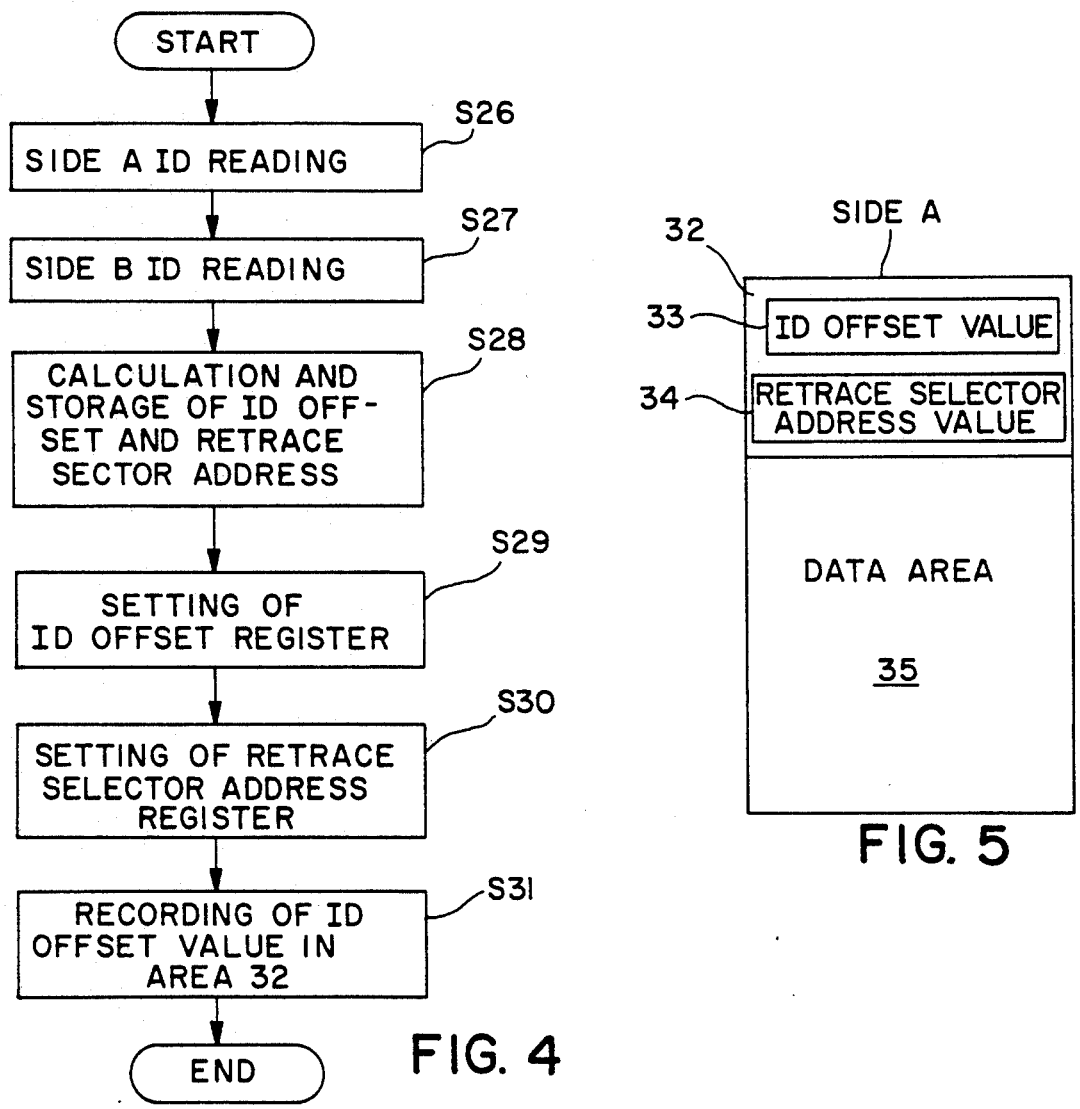
FIG. 4
FIG. 5

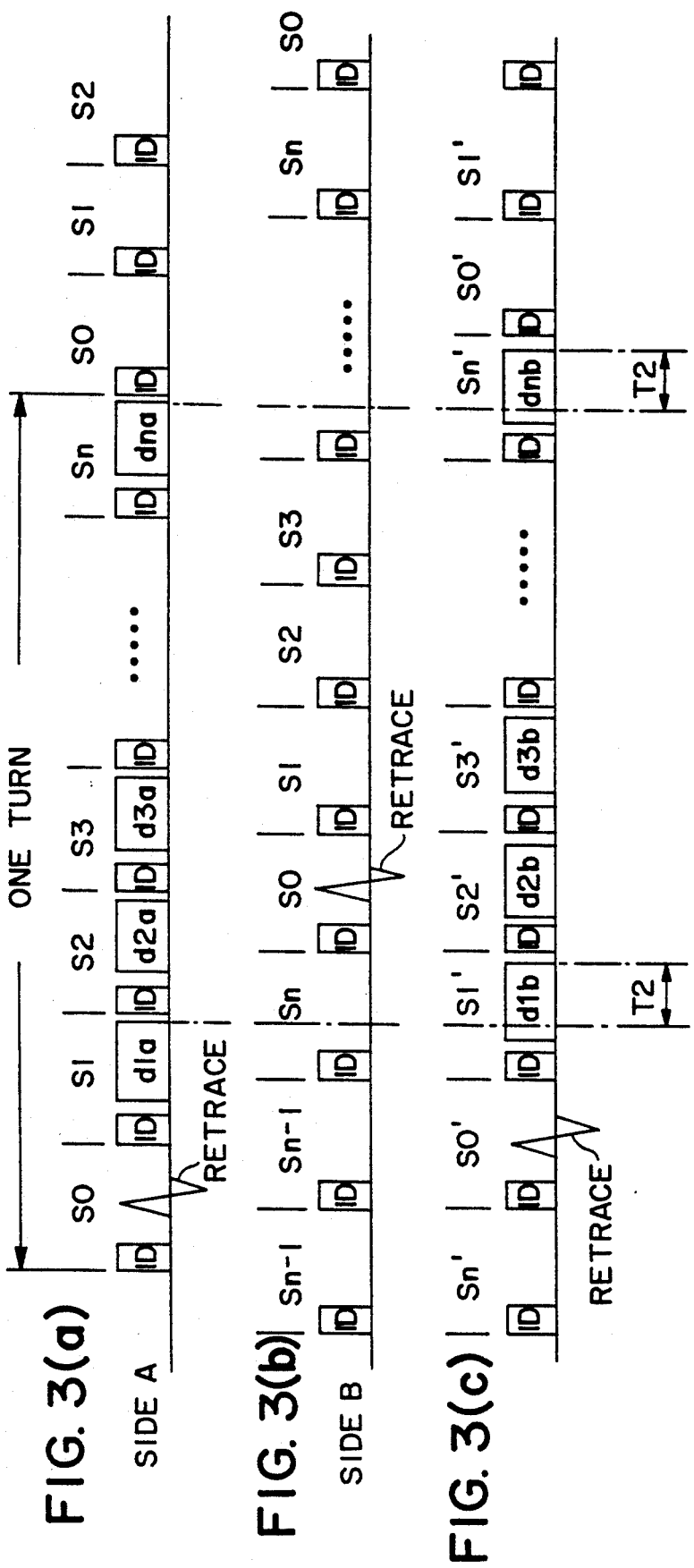

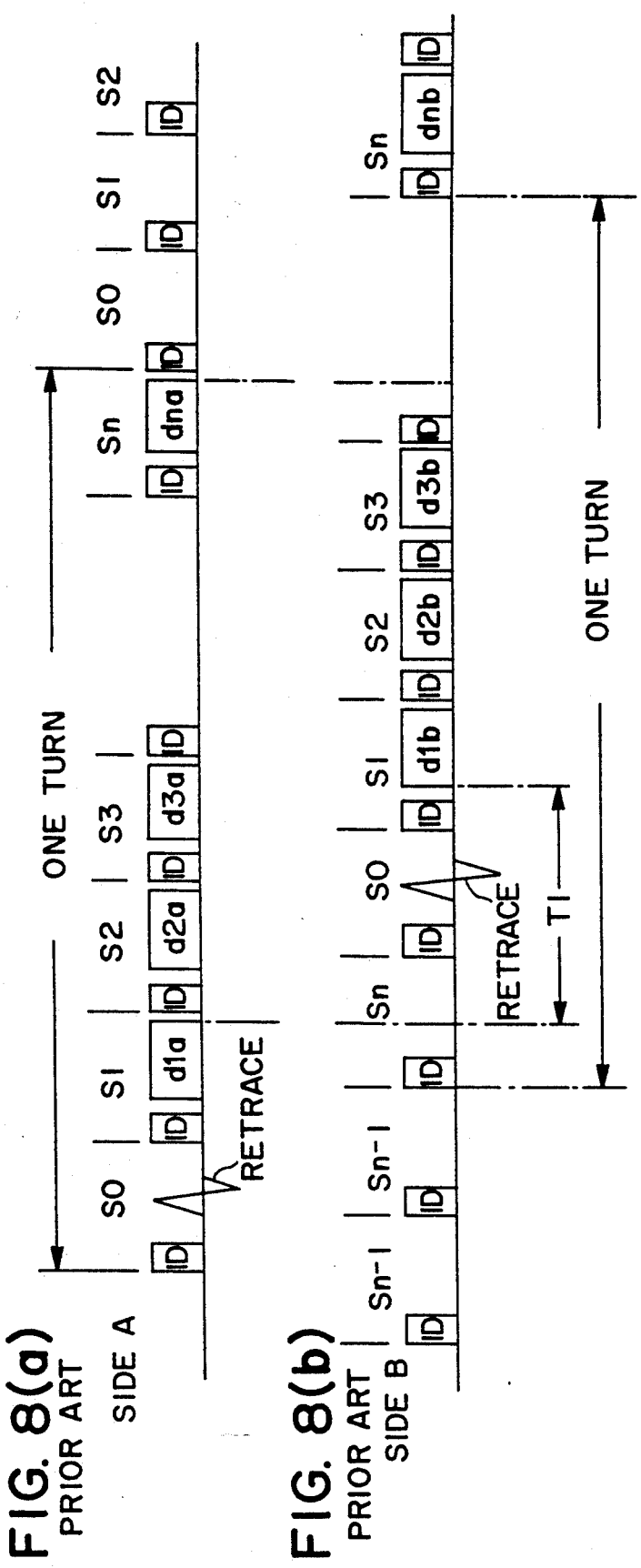

DOUBLE-SIDED OPTICAL DISC PLAYER

BACKGROUND OF THE INVENTION

1. Field of the Invention

The present invention generally relates to an information recording and/or reproducing apparatus for recording or reproducing information on or from an optical disc, respectively. More specifically, the present invention relates to a double-sided disc recording and/or reproducing apparatus for recording or reproducing information on or from a double-sided optical disc, respectively.

2. Description of the Prior Art

The optical disc memory is currently highlighted as one of high-density, non-contact information storage media. Because of a high memory capacity and a capability of use in a non-contact information recording and/or reproduction, the optical disc is generally recognized superior to a magnetic recording and/or reproducing disc. So long as a media size of 5.25 inches is concerned, the double-sided magnetic disc having a maximum memory capacity of 1.5-GB and the double-sided optical disc having a maximum memory capacity of 1.0-GB are currently available.

However, most of the conventional optical disc recording and/or reproducing apparatus (hereinafter referred to as an optical disc player) is equipped with a single optical head and, therefore, the maximum on-line memory capacity to which the single optical head can make an access without the optical disc being reversed is generally limited to half the maximum memory capacity, that is, 500-MB. A relatively recent development is an optical disc player equipped with two optical heads one allocated for each side of the double-sided optical disc, an example of which is schematically shown in FIG. 6. It is to be noted that, in the system of FIG. 6, a servo circuit and a retrieval circuit are not illustrated because they are well known to those skilled in the art.

Referring to FIG. 6, the double-sided optical disc generally identified by 1 comprises a pair of disc-shaped substrates 40 having respective recording surfaces 3A and 3B (which surfaces 3A and 3B may be referred to as disc side A and disc side B of the double-sided optical disc as a whole), said substrates 40 being concentrically bonded together by means of a bond layer 38 with the recording surfaces 3A and 3B confronting with each other. The prior art double-sided optical disc player shown therein generally comprises a pair of optical heads 4A and 4B for projecting respective laser beams towards the disc sides A and B of the optical disc 1, respectively, and a pair of data recording and/or reproducing circuits (Data Rec/Rep CKT) 36A and 36B associated respectively with the optical heads 4A and 4B. Each of the data recording and/or reproducing circuit 36A and 36B is designed to apply a recording signal, i.e., a signal to be recorded onto the optical disc 1, to the associated optical head 4A or 4B when the system is in a recording mode, or to demodulate a recorded signal, i.e., a signal picked up from the optical disc 1, supplied from the associated optical disc 4A or 4B when the system is in a playback mode. Reference numerals 37A and 37B represent respective data lines through which data to be recorded or demodulated data are supplied to or from the associated data recording and/or reproducing circuits 36A and 36B.

FIGS. 7(a) and 7(b) illustrates the recording surfaces 3A and 3B, i.e., the disc sides A and B of the double-sided optical disc 1, as viewed from the associated optical heads 4A and 4B, respectively. As shown therein, each side A and B of the optical disc 1 has tracks 39A or 39B divided into a plurality of sectors S0, S1, S2, . . . and Sn which is the basic unit of storage. It is to be noted that the spiral direction of the tracks 39A on the recording surface 3A is opposite to that of the tracks 39B on the recording surface 3B.

FIGS. 8(a) and 8(b) illustrate, in timed relationship, signals reproduced by the optical heads 4A and 4B from the recording surfaces 3A and 3B of the double-sided optical disc 1, respectively. In each of these figures, reference character ID represents an identification area for each sector S0, S1, . . . and Sn in which track and sector addresses are recorded.

Each of the optical heads 4A and 4B retraces concentrically the tracks of the same address by jumping the tracks at the sector S0.

The double-sided optical disc 1 is manufactured by preparing two replica discs using two master discs that have respective tracks 39A and 39B thereon extending in the opposite spiral directions, forming a recording layer on one surface of each of the replica discs and bonding one the two replica discs to the other of the replica disc so that, while the one of the replica discs is driven in one direction about its center, the imbalance attains a value lower than a predetermined value when both replica discs are bonded together thereby to secure a dynamic balance. Because of this, the position of the sector S0 on the disc side A does not align with that of the sector S0 on the disc side B in a direction across the thickness of the optical disc 1 and is angularly offset relative thereto with respect to the axis of rotation of the optical disc 1.

The manner in which information on the respective sectors on each of the recording surfaces 3A and 3B is recorded by the associated optical head 4A and 4B shown in FIG. 6 will now be discussed with reference to FIG. 8.

It is assumed that data of a size which would occupy the sectors S1 to Sn are to be recorded on the recording surfaces 3A and 3B, respectively. Then, data fed through the data line 37A are modulated by the data recording and/or reproducing circuit 36A and are then recorded by the optical head 4A on the recording surface 3A to fill up data field areas within the respective sectors S1 to Sn as shown by d1a, d2a, . . . and dna. Similarly, data fed through the data line 37B are modulated by the data recording and/or reproducing circuit 36B and are then recorded by the optical head 4B on the recording surface 3B to fill up data field areas within the respective sectors S1 to Sn as shown by d1b, d2b, . . . and dnb.

The data recorded in the above described manner on the track in each sector can be reproduced in the following manner.

When the optical head 4A scans the sector S1 on the recording surface 3A, the data recording and/or reproducing circuit 36A demodulates the reproduced signal fed from the optical disc 4A and then outputs the data d1a through the data line 37A. As the optical head 4A sequentially scans the remaining sectors S2 to Sn, the data recording and/or reproducing circuit 36A similarly sequentially outputs the respective data d2a to dna through the data line 37A. In a similar manner, the data recording and/or reproducing circuit 36B associated with the optical head 4B sequentially outputs the data d1b to dnb through the data line 37B.

However, since as hereinbefore described the position of the sectors on the recording surface 3A are angularly offset relative to that of the sectors on the recording surface 3B by an angular distance which, in the example shown in FIG. 8, corresponds to about 2 sectors, the complete information recording requires an extra time corresponding to a length of time which would pass subsequent to the completion of information recording on a track component in the last sector Sn on the disc side A and prior to the completion of information recording on a track component in the last sector Sn on the disc side B as indicated by T1. Accordingly, that means that, when it comes to the reproducing the recorded, the optical disc 1 has to be driven an extra time which is essentially equal to the length of time T1 discussed above.

In other words, during the recording mode, the complete information recording may takes a total length of time corresponding to the sum of the time required to complete an actual information recording on a required number of the sectors plus the time during which the optical head scans idle over the offset angular distance. On the other hand, during the playback mode, data output is delayed a length of time corresponding to the time T1 and, therefore, the complete information reading takes a total length of time equal to the time required during the recording mode. Because of this, when it comes to the recording or reproducing of information on or from both disc sides A and B of the double-sided optical disc, the angular displacement in position of the sectors between the opposite sides A and B obviously result in a reduction in throughput.

SUMMARY OF THE INVENTION

In view of the foregoing, the present invention has for its essential object to reduce the total time required to complete the data recording or reproduction by detecting an angular displacement in address location in track sector between the opposite sides of a double-sided optical disc and then by correcting the sector address on one of the opposite sides of the optical disc.

In order to accomplish the foregoing object, the present invention provides an improved double-sided optical disc player which comprises first and second optical heads for irradiating laser beams to tracks on respective sides of a double-sided optical disc; a focusing and tracking servo means; a track retrieval means; first and second ID read-out means for reading respective sector addresses out from associated sector identifiers; an ID offset detecting means for calculating, in response to outputs from the ID read-out means, the ID offset value descriptive of an angular displacement in sector position between the opposite sides of the optical disc traced by the associated optical heads; an ID offset retaining means for retaining the ID offset value; a first sector recording and/or production control means for detecting a target sector when an sector address output from the first ID read-out means coincide with the target sector and for activating a recording or reproduction of information; an adder means for adding the ID offset value to an output from the second ID read-out means; a second sector recording and/or reproduction control means for detecting a target object when an corrected sector address outputted from the adder means coincides with the target sector and for activating the recording or reproduction of the information; and an information recording and/or reproducing means for recording or reproducing information on or from the target sectors on the respective sides of the optical disc by means of the first and second sector recording and/or reproduction control means.

BRIEF DESCRIPTION OF THE DRAWINGS

This and other objects and features of the present invention will become readily understood from the following description of a preferred embodiment taken with reference to the accompanying drawings, in which like parts are designated by like reference numerals and in which:

FIG. 2 is a circuit block diagram showing the details of one of sector recording and/or reproduction control circuits employed in the optical disc player;

FIGS. 3(a) and 3(b) illustrate, in timed relationship, signals reproduced by two optical heads from opposite recording surfaces of the double-sided optical disc 1, respectively, according to the embodiment of the present invention;

FIG. 3(c) illustrate, in timed relationship with any one of FIGS. 3(a) and 3(b), a virtual sector signal associated with one of the recording surfaces of the optical disc;

FIG. 4 is a flowchart showing the sequence of an ID offset value processing;

FIG. 5 is a diagram showing a track allocation table associated with one of the recording surfaces of the optical disc;

FIGS. 8(a) and 8(b) illustrate, in timed relationship, signals reproduced by the optical heads in the prior art optical disc player from the recording surfaces of the double-sided optical disc 1, respectively.

DETAILED DESCRIPTION OF THE EMBODIMENT

Figure 1:
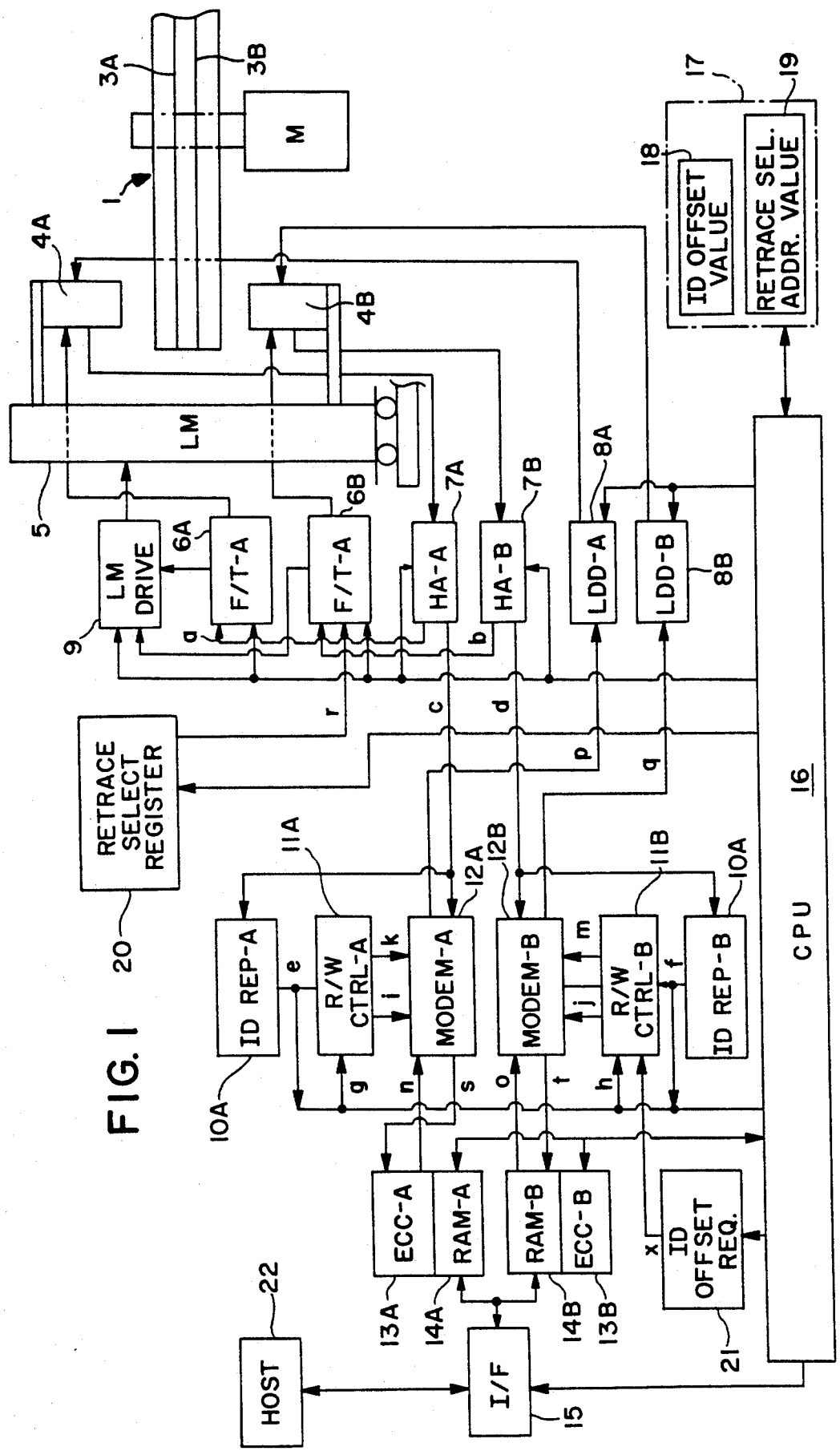
FIG. 1 is a block diagram showing a double-sided optical disc player according to a preferred embodiment of the present invention.

Referring first to FIG. 1, the double-sided optical disc 1 is mounted on a spindle, drivingly coupled with a drive motor M, for rotation together therewith. As is the case with the optical disc discussed in connection with the prior art optical disc player, the optical disc 1 has the opposite disc sides A and B, or the opposite recording surfaces 3A and 3B, adapted to be irradiated by the optical heads 4A and 4B. The optical heads 4A and 4B, the details of each of which are well known to those skilled in the art, are mounted on a linear motor (LM) 5 supported for movement close towards and away from the optical disc 1 so as to bring the optical heads 4A and 4B clear from and immediately above and below the recording surfaces 3A and 3B of the optical disc 1.

The optical disc player embodying the present invention includes a unique control circuit. This control circuit comprises a linear motor drive control (LM Drive) 9 for controlling the linear motor 5 so as to permit the first and second optical heads 4A and 4B to access to respective desired tracks, an interface (I/F) 15 connected with a host computer 22 through an SCSI (Small Computer System Interface) bus, and a microcomputer (CPU) 16 operable to control the entire sequence of operation of the optical disc player and having an internal memory unit 17. The control circuit referred to above also comprises Side-A and Side-B circuit sections associated respectively with the first and second optical heads 4A and 4B and, hence, the sides A and B of the optical disc 1.

The Side-A circuit section includes a focusing and tracking control circuit (F/T-A) 6A for controlling focusing and tracking operations of the first optical head 4A and for causing the first optical head 4A to retrace the track on the side A of the optical disc; a head amplifier (HA-A) 7A for detecting and amplifying a servo error signal a and a reproduced signal c all associated with the first optical head 4A; a laser drive circuit (LDD-A) 8A for driving a semiconductor laser associated with the first optical head 4A; a sector ID reproducing circuit (ID Rep.-A) 10A for reading a track sector address e out from an sector identifier contained in the reproduced signal c originating from the first optical head 4A; a sector recording and/or reproduction control circuit (R/W Ctrl-A) 11A for determining a coincidence between the track sector address e and a target sector address g at which data is to be recorded or reproduced and for generating a write-gate signal i and a read-gate signal k to the target sector; a data modulating and demodulating circuit (MODEM-A) 12A for modulating encoded data n according to 2-7 RLLC (Run Length Limited Code) to provide a digital modulated signal p and for demodulating the reproduced signal c to provide a demodulated data s; an error correcting circuit (ECC-A) 13A for synthesizing the coded data n by adding an error correcting encoded to a recording data and for detecting and connecting an error in the demodulated data s to correct the latter; and a buffer memory (RAM-A) for the temporary storage of data.

The Side-B circuit section includes a focusing and tracking control circuit (F/T-B) 6B for controlling focusing and tracking operations of the second optical head 4B, selecting an output r from a retrace selecting register (Retrace Select Reg) 20 and for causing the first optical head 4B to retrace the track on the side B of the optical disc; a head amplifier (HA-B) 7B for detecting and amplifying a servo error signal b and a reproduced signal d all associated with the second optical head 4B; a laser drive circuit (LDD-B) 8B for driving a semiconductor laser associated with the second optical head 4B; a sector ID reproducing circuit (ID Rep.-B) 10B for reading a track sector address f out from an sector identifier contained in the reproduced signal d originating from the second optical head 4B; a sector recording and/or reproduction control circuit (R/W Ctrl-B) 11B for determining a coincidence between a corrected sector address, corrected by adding an output x from an offset register 21, to a track sector address f, and a target sector address h at which data is to be recorded or reproduced and for generating a write-gate signal j and a read-gate signal m to the target sector; a data modulating and demodulating circuit (MODEM-B) 12B for modulating encoded data o according to 2-7 RLLC (Run Length Limited Code) to provide a digital modulated signal q and for demodulating the reproduced signal d to provide a demodulated data t; an error correcting circuit (ECC-B) 13B for synthesizing the encoded data o by adding an error correcting code to a recording data and for detecting and connecting an error in the demodulated data t to correct the latter; and a buffer memory (RAM-B) for the temporary storage of data.

The memory unit 17 stores therein an ID offset value 18 that is descriptive of an angular displacement in sector position between the track on the side A and that on the side B and, also, a retrace sector address value 19 by which the track on the side B of the optical disc is to be jumped for retracing. The retrace selecting register 20 accommodates the retrace selector address value 19. Reference numeral 21 represents an ID offset register for accommodating the ID offset value 18 stored in the memory unit 17.

FIG. 2 illustrates the details of the sector recording and/or reproduction control circuit (R/W Ctrl-B) 11B shown in FIG. 1. The sector recording and reproduction control circuit 11B comprises an adder circuit 23 operable to add the output x of the ID offset register 21 to the track sector address f to be read out and to perform an address correction so that the sector position on the side B of the optical disc can be virtually aligned with the sector position on the side 3A thereof, a coincidence comparing circuit for determining a coincidence between the corrected sector address z and the target sector address h, and a logic circuit for generating the write-gate signal j and the read-gate signal m based on a write/read command wr and an output from the coincidence comparator 24.

FIG. 3 illustrates signals reproduced by the first and second optical heads 4A and 4B from the opposite recording surfaces of the double-sided optical disc 1. In particular, FIG. 3(a) illustrates the signal c reproduced from the recording surface 3A, FIG. 3(b) illustrates the signal d reproduced from the recording surface 3B, and FIG. 3(c) illustrates a virtual sector signal reproduced from the recording surface 3B and having sector identifiers so corrected by the ID offset value 18 that the address value of each sector identifier can match with the corrected address value z. The address value of each identifier is located at the head of each sector and forms a part of the sector identified in which the track and the sector address are recorded. Reference characters $d1a$, $d2a$, ... and $dna$ and $d1b$, $d2b$, ... and $d2n$ represent data recorded on data field areas of each sector on the associated recording surfaces 3A and 3B, respectively.

The sector signal d reproduced from the side B of the optical disc 1 shown in FIG. 3(b) has a sector position displaced a distance of two sectors from the sector signal c reproduced from the side A shown in FIG. 3(a). This displacement in sector position can be expressed as follows, provided that, immediately after the first optical head 4A has detected the sector address Si, the second optical head 4B detects the sector address Sj.

$$ID \text{ Offset } Soff = (\text{Sector } Si - \text{Sector } Sj) MOD(n+1)$$
$$= 2 \text{ (In the case of FIG. 3)}$$

Similarly, the virtual sector address Sj' of the virtual sector signal reproduced from the disc side B as shown in FIG. 3(c) can be expressed as follows.

$$Sj' = (Sj + Soff) MOD(n+1)$$

Referring now to FIG. 3(a), the first optical head 4A jumps a single track at the sector S0 on the disc side A and retraces the spiral track. On the other hand, the second optical head 4B retraces, in place of the sector S0 shown in FIG. 3(b), at a virtual sector S0' of FIG.

3(c) that corresponds to the sector S0 on the disc side A. In other words, the sector address S0' on the disc side B which is retraced after the ID offset has been corrected can be expressed as follows.

$$\text{Retraced Address } S0' = [S0(\text{Side } A) - S\ OFF]MOD(n+1)$$
$$= -2 = Sn - 1 \text{ (In the case of FIG. 3)}$$

By so doing, information recording or reproduction on or from the disc sides A and B of the optical disc 1 can be accomplished at a timing difference corresponding to about one sector. In addition, since the retrace of the spiral tracks on the disc sides A and B is carried out at the same sector with respect to the corrected sector address, a spiral track processing for data writing or reading is carried out at the substantially same timing on the respective disc sides A and B and, consequently, no unnecessary wait for an extra rotation of the optical disc 1 is required permitting the recording or reproducing process to be quickly performed. Nevertheless, the track retraced during each rotation of the optical disc 1 by the second optical head 4B consequent upon a change in sector position to be retraced includes two track addresses and, therefore, it is necessary to perform a proper track address correction appropriate to the track retrieval.

FIG. 4 illustrates a flowchart showing the ID offset processing which will now be described. As shown in FIG. 4, at step S26, the central processing unit 16 causes the ID reproducing circuit 10A to read the sector address Si out from the disc side A. At step S27, the central processing unit 16 causes the ID reproducing circuit 10B to read the sector address Sj out from the disc side B. Then, at step S28, the central processing unit 16 calculates the ID offset value 18 and the retrace sector address S0' in reference to the sector addresses Si and Sj and stores them as the ID offset value 18 and the retrace sector address value 19. At step S29, the central processing unit 16 set the ID offset value 18 to the ID offset register 21. At subsequent step S30, the central processing unit 16 sets the retrace sector address value 19 to the retrace sector register 20. At step S31, the central processing unit 16, when the optical disc is a fresh one used for the first time, records the ID offset value 18 and the retrace sector address value 19 on a managing area 32 on the disc side A of the optical disc as shown in FIG. 5 as an ID offset value 33 and a retract sector address value 34, respectively.

FIG. 5 illustrates a track allocation table on the disc side A of the optical disc. The disc side A has the managing area 32, in which the ID offset value 33 and the retrace sector address 34 are recorded, and a data area 35 available to a user to record data thereon. Where the ID offset value 33 and the retrace sector address value 34 are recorded on a number of the optical discs 1, those optical discs become compatible with each other.

The operation of the double-sided optical disc player of the above described construction will now be described.

When the double-sided optical disc 1' is mounted on the spindle of the drive motor M, the central processing unit 16 determines the ID offset value in the following sequence. In the event that the optical disc 1 so mounted on the motor spindle is a fresh one having not yet been used before, the central processing unit 16 executes the program flow shown in FIG. 4 to determine the ID offset value 18 and the retrace sector address value 19 and then to record them on the managing area 32 of the optical disc 1. On the other hand, should the optical disc 1 mounted on the motor spindle is a once-used disc, the central processing unit 16 reads both the ID offset value 33 and the retrace sector address value 34 out from the managing area 32 of the optical disc 1 and then accommodate them in the ID offset value 18 and the retrace sector address value 19 of the memory unit 17.

Subsequently, the central processing unit 16 performs the retrace sector address correction and the sector address correction. The central processing unit 16 reads the retrace sector address value 19 of the memory unit 17 and then set it to the retrace sector address register 20. Thereafter, the second optical head 4B performs a one-track jumping at the virtual sector S0' (physical address Sn−1 on the disc side B in the example of FIG. 3). The central processing unit 16 reads out the ID offset value 18 of the memory unit 17 and sets it to the ID offset register 21. Thereafter, the recording or reproduction of information from the optical side B by means of the second optical head 4B is carried out with respect to the corrected sector address z.

In the manner described above, the optical disc player is brought in position ready for performing an actual information recording or reproduction. This actual information recording or reproduction is carried out in the following manner.

The host computer 22 dispatches a line command to the SCSI bus y which is supplied to the central processing unit 16 through the interface 15. The central processing unit 16 then interpret the command and issues to the linear motor drive circuit 9 a command necessary to move the optical heads 4A and 4B to the target tracks, causing the linear motor 5 to be driven. Recording data supplied from the host computer 22 is temporarily stored in the random access memories 14A and 14B in units of a sector, and the error correcting circuits 13A and 13B outputs encoded data n and o representative of the recording data to which the error correcting codes have been added. The central processing unit 16 set both of the recording sector address and the recording command wr to the sector recording/reproduction control circuits 11A and 11B. When the sector recording/reproduction control circuit 11A and 11B detect predetermined sectors, the line gate signals i and j are supplied to the data modulating and demodulating circuits 12A and 12B so that the modulated signals p and q which corresponds to the encoded data n and o modulated according to 2-7 RLLC can be outputted to the laser drive circuits 8A and 8B. Then, the optical head 4A records the modulated signal p on the sectors on the side A of the disc 1 while the optical head 4B records the modulated signal q on the sectors on the side B of the disc which have been corrected by the ID offset value. The foregoing data recording is carried a required number of sectors to record the data d1a, d2a, . . . and dna or d1b, d2b, . . . and dnb on the respective sectors.

Figure 6:
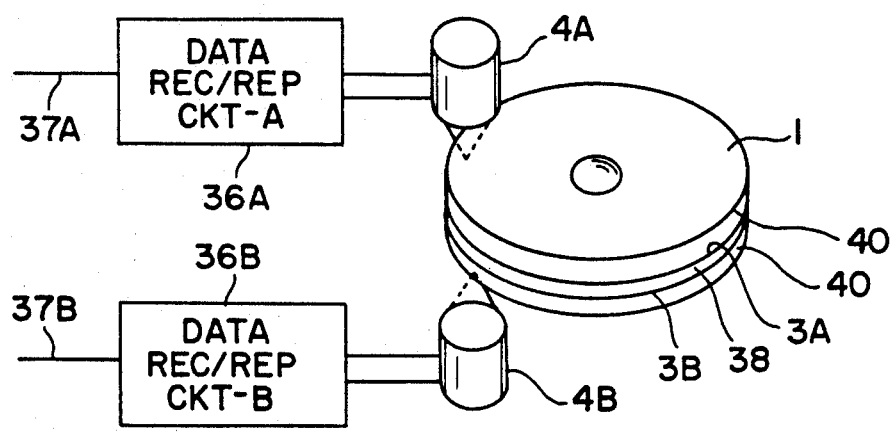
FIG. 6 is a circuit block diagram showing the prior art double-sided optical disc player.
Figure 7A:
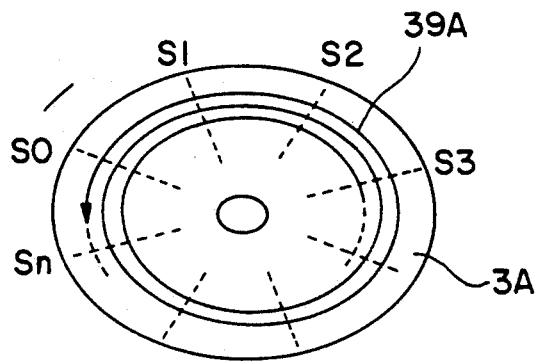
FIGS. 7(a) and 7(b) illustrates the opposite recording surfaces of the double-sided optical disc 1, as viewed from the associated optical heads, respectively.
Figure 7B:
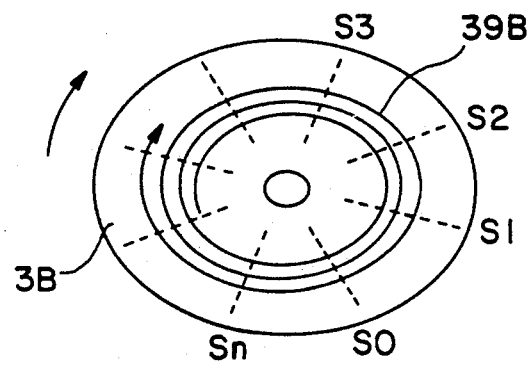

As hereinbefore described, the virtual sector address is given to the side B of the optical disc 1 and the recording sector positions on the sides A and B are corrected to attain a minimum distance, followed by the recording. Consequently, the length of time required for the predetermined sector to be brought into alignment with the respective optical head can be reduced. In other words, the optical head 4A makes a recording on the sector S1 to the sector Sn while the optical head 4B makes a recording on the sector S1' to the sector Sn' and the time at which the recording is completed is at a timing reduced a value (T1−T2) as compared with the case of FIG. 6.

The data reading reproduction now be described.

The host computer 22 dispatches a read command to the SCSI bus y which is supplied to the central processing unit 16 through the interface 15. The central processing unit 16 then interpret the command and issues to the linear motor drive circuit 9 a command necessary to move the optical heads 4A and 4B to the target tracks, causing the linear motor 5 to be driven. The central processing unit 16 set both of the recording sector address and the recording command wr to the sector recording/reproduction control circuits 11A and 11B. When the sector recording/reproduction control circuit 11A and 11B detect predetermined sectors, the read gate signals k and m are supplied to the data modulating and demodulating circuits 12A and 12B. The data modulating and demodulating circuit 12A demodulates the reproduced signal c from the optical disc 4A to provide the demodulated data s which is subsequently accommodated in the random access memory 14a. On the other hand, the data modulating and demodulating circuit 12B demodulates the sector at the address z corrected by the ID offset value of the reproduced signal d from the optical disc 4B to provide the demodulated data t which is subsequently accommodated in the random access memory 14B. The demodulated data stored in the respective random access memories 14A and 14B are supplied to the error correcting circuits 13A and 13B at which the error detection and correction are performed and are, thereafter, stored in the respective random access memories 14A and 14B again. The reproduced data which has been corrected are transferred to the host computer 22 through the interface 15. The foregoing data reproduction is carried a required number of sectors to read out the data d1a, d2a, ... and dna or d1b, d2b, ... and dnb on the respective sectors.

As hereinbefore described, the optical head 4A and the optical head 4B read information from the sector S1 to the sector Sn and from the sector S1' to the sector Sn', respectively. Accordingly, the transfer of the reproduced data to the host computer 22 starts at a timing delayed a value (T1−T2) as compared with the case of FIG. 6 while the completion of the reproduction terminates at a timing earlier by the value (T1−T2) than that according to the prior art.

By way of example, if the number of sectors per track is 32 and an average ID offset is one fourth of the number of the sectors, that is, 8 sectors, the length of time corresponding to 7 sectors can be reduced in recording or reproduction.

As hereinbefore described, the side B of the optical disc is given the sector address z corrected virtually by the ID offset value with respect to the side A of the same optical disc so that a spacing between the sectors of the same address on the respective sides A and B of the optical disc is adjusted to a minimum distance (not greater than one sector) before the data recording or reproduction takes place. Therefore, the during which a wait is made before a selected one of the sectors is brought into alignment with the associated optical head can be reduced. In other words, the time at which both of the optical heads complete the recording or reproduction of information from the associated disc sides A and B of the optical head can be improved to a value corresponding to the number of the recording sectors plus one sector. Also, during the reading of the data, the transfer of the data to the host computer may be delayed in a magnitude of one sector at maximum.

As hereinabove described, by detecting the angular displacement in sector position between the same sector identifiers on the respective sides of the double-sided optical disc and then carrying out the data recording or reproduction while the sector identifier on one of the sides of the optical disc is corrected, the processing time can be shortened. Accordingly, no alignment between the sector identifiers on the respective sides of the optical disc is required, and the imbalance of the disc can be suppressed by boding the replicas, corresponding respectively to the opposite sides of the resultant optical disc, together while they are rotated, eliminating the necessity of a special machining process which is hitherto been employed to form a mounting hub at a disc center thereby to minimize the imbalance.

It is to be noted that, although in the foregoing embodiment the track has been described as formed spirally, the present invention can be equally applicable to concentric tracks.

Although the present invention has been described in connection with the preferred embodiment thereof with reference to the accompanying drawings, it is to be noted that various changes and modifications are apparent to those skilled in the art. Accordingly, unless they depart from the scope of the present invention as defined by the appended claims, they should be construed as included therein.

What is claimed is:

1. A double-sided optical disc player operable with a double-sided optical disc, which comprises:
    first and second optical heads for irradiating laser beams to tracks on respective opposite sides of the double-sided optical disc;
    first and second servo means for focusing and tracking the laser beams towards predetermined tracks on the opposite sides of the optical disc, respectively;
    at least one retrieval means for sending the first and second optical heads towards the predetermined tracks;
    first and second ID read-out means for reading respective sector addresses out from associated sector identifiers on the respective opposite sides of the optical disc;
    an ID offset detecting means for calculating, in response to outputs from the ID read-out means, an ID offset value descriptive of an angular displacement in sector position between the opposite sides of the optical disc traced by the associated optical heads;
    an ID offset retaining means for retaining the ID offset value;
    a first sector recording and/or production control means for detecting a target sector when a sector address output from the first ID read-out means coincide with the target sector on one of the sides of the optical disc and for activating a recording or reproduction of information;
    an adder means for adding the ID offset value to an output from the second ID read-out means;
    a second sector recording and/or reproduction control means for detecting a target object when a corrected sector address outputted from the adder means coincides with the target sector on the other of the sides of the optical disc and for activating a recording or reproduction of the information; and an information recording and/or reproducing means for recording or reproducing information on or from the target sectors on the respective sides of the optical disc by means of the first and second sector recording and/or reproduction control means.

2. The double-sided optical disc player as claimed in claim 1, wherein said information recording and/or reproducing means records the ID offset value on a managing area of the optical disc.

3. The double-sided optical disc player as claimed in claim 1, wherein said information recording and/or reproducing means reproduces the ID offset value from an managing area of the optical disc and sets the ID offset value to the ID offset retaining means.

4. A double-sided optical disc player operable with a double-sided optical disc formed by bonding a pair of recording bases together, each of said recording bases having a spirally extending tracks divided into a plurality of sectors which is a unit of storage, said player comprising:

first and second optical heads for irradiating laser beams to tracks on respective opposite sides of the double-sided optical disc;

first and second servo means for focusing and tracking the laser beams emitted from the first and second optical heads, respectively, and also for retracing the spiral tracks by jumping one track at a predetermined track;

at least one retrieval means for sending the first and second optical heads towards the predetermined tracks;

first and second ID read-out means for reading respective sector addresses out from associated sector identifiers on the respective opposite sides of the optical disc;

an ID offset detecting means for calculating, in response to outputs from the ID read-out means, an ID offset value descriptive of an angular displacement in sector position between the opposite sides of the optical disc traced by the associated optical heads;

a calculating means for calculating, from the ID offset value, a retrace sector address value of one of the sides of the optical disc that corresponds to a sector address retraced by the first optical head;

a retrace sector address retaining means for retaining the retrace sector address value; and at least one information recording and/or reproducing means for recording or reproducing information on or from the target object on each of the opposite sides of the optical disc;

said servo means being operable to cause the second optical head to retrace according to the retrace sector address value retained in the retrace sector address retaining means.

5. the double-sided optical disc player as claimed in claim 4, wherein said information recording and/or reproducing means records the retrace sector address value on a managing area of the optical disc.

6. The double-sided optical disc player as claimed in claim 4, wherein said servo means is operable to set the retrace sector address value reproduced from an managing area of the optical disc and also to render an output from the retrace sector address retaining means to be a sector address to be retraced.

* * * * *